United States Patent [19]
Gulczynski

[11] Patent Number: 5,196,995
[45] Date of Patent: Mar. 23, 1993

[54] 3-TERMINAL BIDIRECTIONAL SWITCHING POWER SUPPLY WITH AC OR DC INPUT AND AC OR DC OUTPUT

[76] Inventor: Zdzislaw Gulczynski, P.O. Box 441, Winchester, Mass. 01890

[21] Appl. No.: 444,729

[22] Filed: Dec. 1, 1989

[51] Int. Cl.⁵ .................................... H02M 3/335
[52] U.S. Cl. ............................ 363/16; 363/65; 363/127; 363/131; 323/224; 323/225; 323/271
[58] Field of Search ............ 323/224, 225, 222, 268, 323/271; 363/16, 65, 69, 70, 80, 125, 127, 131

[56] References Cited

U.S. PATENT DOCUMENTS

| | | | |
|---|---|---|---|
| 4,085,358 | 4/1978 | Holcomb | 363/16 |
| 4,736,151 | 4/1988 | Dishner | 363/16 |
| 4,736,284 | 4/1988 | Yamagishi et al. | 363/16 |
| 4,814,685 | 3/1989 | Renger | 323/224 |
| 4,841,564 | 6/1989 | Schoofs | 323/224 |

*Primary Examiner*—Peter S. Wong

[57] ABSTRACT

The bidirectional switching power supply has high output power, high efficiency, high reliability and very small size. One device operates as DC/DC, DC/AC, AC/DC or AC/AC converter. Short circuit protection is inherent. The switching power supply can be carried out in integrated form as 3-terminal device. Additional terminals can be established for reference and control signals. Numerous standard devices can be built by adding just a few components, possibly no power semiconductors. The switching power supply comprises an inductor which has a pair of terminals and attains a current. Three unidirectional switches are coupled to one terminal for selectively applying the current to the input, ground and output. Two other unidirectional switches are coupled to the other terminal for selectively applying the current to ground and output. A diode or unidirectional switch can be coupled to the other terminal for applying the current to the input. Regardless of the configuration and polarities of the input and output voltages, the inductor current flows in one direction.

20 Claims, 6 Drawing Sheets

3-TERMINAL BIDIRECTIONAL SWITCHING POWER SUPPLY WITH AC OR DC INPUT AND AC OR DC OUTPUT

BACKGROUND OF THE INVENTION

The invention relates to 3-terminal bidirectional switching power supply (SPS), particularly for power supply systems requiring high output power, high efficiency, high reliability and very small size. One device operates as DC/DC, DC/AC, AC/DC or AC/AC converter. A power transformer is eliminated in order to minimize EMI, RFI, power loss, size, weight, cost, etc. Short circuit protection is inherent The SPS can be employed in a simple SPS, switching power amplifier, uninterruptible power supply (UPS), programmable converter, line conditioner, AC voltage converter, frequency converter, power factor correction circuit etc.

Conventional SPSs perform multiple conversions in order to obtain a desired AC output signal. The line voltage is rectified. The rectified voltage is stored in one or two capacitors and converted into high frequency AC signal which is transformed. The transformer output signal is rectified and voltages of opposite polarities are stored in two capacitors. The capacitor voltages are converted into the AC output signal which has the desired waveform. The SPSs employ the isolation transformers whether or not line isolation is required.

Charging the capacitors causes inrush current and surge currents every peak of the AC voltage. Pulse width modulation (PWM) is used which results in numerous problems including high circuit complexity, stability problems and significantly higher effective switching frequency. Numerous interference suppressors and protection circuits are inevitable. Power factor correction circuit is employed which further increases complexity and reduces efficiency.

Power transformers may be the worst components used in electronics, their employment demands specific considerations. For instance, the transformers demonstrate huge EMI and RFI, poor efficiency, leakage inductances, parasitic resistances, resonant elements, frequency limitations, flux symmetry problems, nonlinearities and saturation, bidirectional feedback, inability to provide DC signal, large size and weight, high cost. The imbalance in operating flux level is reduced by a series coupled capacitor which must sustain AC voltage and high currents. The transformers have low impedance output, wherein short circuit protection is inevitable.

UPS systems provide AC power during commercial power fluctuations and interruptions. An UPS comprises a charger, battery and inverter. The charger rectifies the line voltage and charges the battery. The inverter converts the battery voltage and provides the AC power. A continuous UPS system is coupled in series with line. The charger must be able to deliver enough power to drive the inverter at full load, maintain the charge on the battery and handle momentary overloads. A forward transfer UPS system is coupled in parallel with line and delivers AC power only during the power failure. A bidirectional transfer switch connects the critical load either to line or inverter output.

An exemplary approach to a high efficiency bidirectional SPS with AC or DC output is disclosed in the abovementioned "Switching Power Supply" U.S. Pat. No. 4,803,610 dated Feb. 7, 1989, by the same inventor. The SPS employs a minimum number of switches and no transformer. For instance, the FIG. 3 embodiment disclosed in U.S. Pat. No. 4,803,610 employs three switches and single inductor for converting a positive and negative voltages into AC or DC output signal and for transferring power from the output to the input sources.

SUMMARY OF THE INVENTION

The present invention is intended to provide a bidirectional SPS having high output power, high efficiency, high reliability and very small size. One device operates as DC/DC, DC/AC, AC/DC or AC/AC converter. A power transformer is eliminated, whereby switching frequency can be very high. This results in small values of reactive components and high accuracy. The SPS employs a single inductor, wherein short circuit protection is inherent. The SPS comprises no capacitors but one or two can be coupled to the input and/or output of the SPS. Inrush, surge currents and voltage spikes are eliminated. Transistors switch at zero voltage and zero current. The SPS can be carried out in integrated form as 3-terminal device. Additional terminals can be established for reference and control signals.

For instance, the SPS can be employed as charger or inverter in continuous UPS system. The SPS can also combine all functions of the charger, inverter and bidirectional transfer switch in the forward transfer UPS system. Other examples, power factor correction circuit and AC voltage converter 220 V/50 Hz to 120 V/50 Hz or 120 V/60 Hz to 220 V/60 Hz can be carried out as 3-terminal hybrid integrated circuit.

There are three basic configurations for converting a predetermined DC input voltage into desired DC output voltage. Assuming positive input voltage, three components of these converters are connected to the input, ground and output respectively:

boost converter - inductor, switch and cathode of diode; buck converter - switch, anode of diode and inductor; and flyback converter - switch, inductor and anode of diode.

The output voltages of the boost and buck converters are higher and lower than the input voltage respectively, and have the same polarity. In contrast, the flyback converter develops output voltage which, relative to the input voltage, has higher or lower value and opposite polarity. Combining buck and flyback converters or boost, buck and flyback converters in one device results in an SPS having a single input and providing AC or DC output current. The input voltage may be AC or DC.

Moreover, the SPS can operate as the boost, buck and flyback converters in the reverse direction, i.e. transfer power from the output to input regardless of polarity of the input and output voltages. The bidirectional power flow allows operation with loads of any kind, e.g. purely inductive or capacitive. However, voltage ratings of real components must be considered.

SPS according to the present invention converts AC or DC input voltage applied to input into AC or DC output current appearing at output and comprises: a first and second nodes separately coupled to the input and output in either order; an inductive means having a pair of terminals, for attaining a current; a first, second and third switching means each coupled to one terminal for selectively applying the inductive means current to the first node, ground and second node respectively;

and a fourth and fifth switching means each coupled to the other terminal for selectively applying the inductive means current to ground and second node respectively.

In another embodiment the SPS converts AC input voltage applied to input into AC or DC output current appearing at output and comprises: a capacitive means having a terminal and coupled to ground for storing a voltage; a first converter means for converting a voltage appearing between the input and terminal into a first current; and a second converter means for converting the AC input voltage into a second current, wherein the first and second currents are applied to the output. A second capacitive means can be used, having a second terminal and coupled to ground for storing a second voltage, wherein the second converter means converts a voltage appearing between the input and second terminal into the second current.

BRIEF DESCRIPTION OF THE DRAWINGS

The present invention will become more clear in conjunction with the accompanying figures throughout which similar references may denote similar parts and of which.

DETAILED DESCRIPTION OF THE INVENTION

Figure 1:
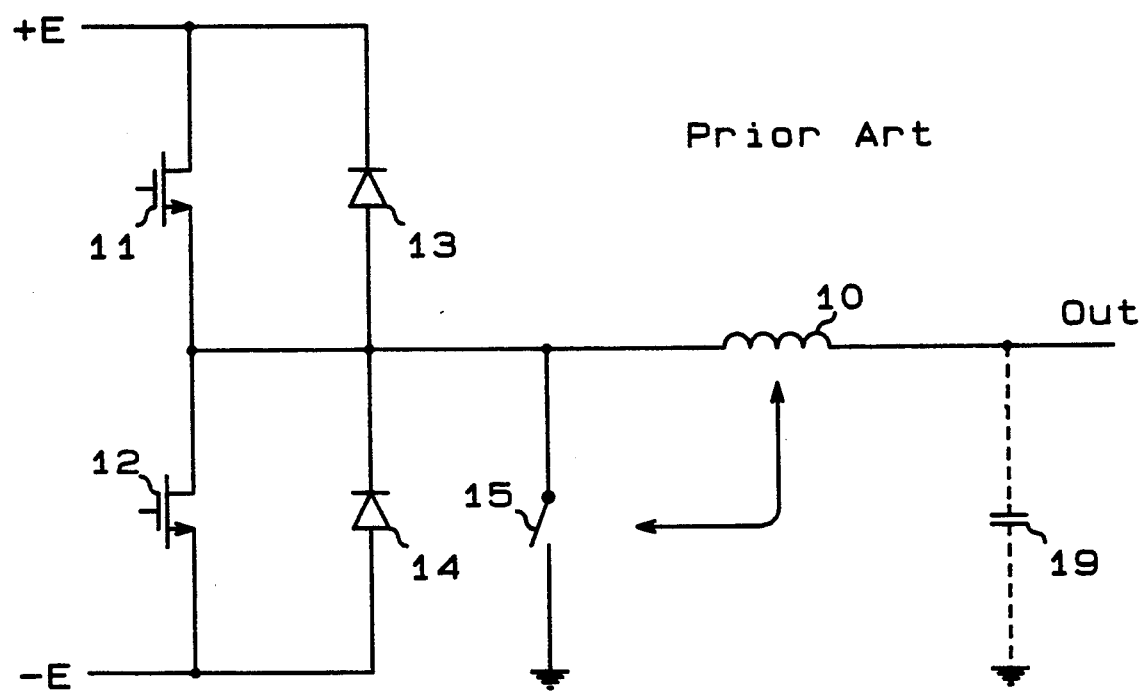
FIG. 1 is the embodiment of bidirectional SPS based on FIGS. 4a and 4b disclosed in the aforementioned "Switching Power Supply" U.S. Pat. No. 4,803,610 dated Feb. 7, 1989, by the same inventor.

FIG. 1 is the embodiment of bidirectional SPS based on FIGS. 4a and 4b disclosed in the aforementioned "Switching Power Supply" U.S. Pat. No. 4,803,610 dated Feb. 7, 1989, by the same inventor. The SPS has a pair of inputs separately coupled to the positive supply voltage $+E$ and negative supply voltage $-E$. The output voltage is AC or DC, wherein no transformer is employed. Moreover, power flow is accomplished from the output to one of the inputs regardless of the output voltage polarity. The SPS includes a pair of unidirectional switches and single bidirectional switch, each coupled to a node. The short circuit protection is inherent. The optional capacitor 19 is coupled between the output and ground. The SPS operates as unidirectional buck and boost converters, or bidirectional flyback converter.

In one embodiment, the inductor 10 and switch 15 are coupled to the node and further to the output and ground respectively. The n-channel MOSFET 11 applies $+E$ to the node when the output voltage is positive and too small. Similarly, the n-channel MOSFET 12 applies $-E$ to the node when the output voltage is negative and too small. When the respective transistor is opened, the bidirectional switch 15 closes, whereby the current of the inductor 10 flows to ground. By these means, the buck function is accomplished regardless of the output voltage polarity. The output current is uninterrupted. The switch 15 can be constantly open, whereby the energy is also transferred from one supply voltage source to the other. The inductor 10 limits the output current when the output voltage is momentarily greater than $+E$ or smaller than $-E$.

The switch 15 is also closed when the output voltage is substantially greater or smaller than zero and too large. The inductor 10 is charged, wherein the load acts as energy source. When the switch 15 is opened, the diode 13 or 14 conducts, whereby power is transferred to the respective supply voltage source. By these means, the boost function is accomplished regardless of the output voltage polarity.

In another embodiment, the inductor 10 and switch 15 are exchanged. By closing the transistor 11 or 12, the inductor 10 is charged. When the respective transistor is opened, the switch 15 closed, whereby the inductor 10 discharges into the load. By switching the switch 15 only, power is transferred in the reverse direction, i.e. from the output to the supply voltage sources. Thereby, the SPS operates as bidirectional flyback converter regardless of the output voltage polarity. Moreover, the SPS can provide output voltages which are greater than $+E$ and smaller than $-E$.

A triac can be employed as switch 15 if the output voltage is in the range of $-E$ to $+E$. The triac is automatically turned off by reducing its principal current below a hold current, wherein the principal current is equal to the inductor current. The triac can be also turned off by reducing its anode voltage, i.e. by momentary closing the transistor 11 or 12. A triac circuit disclosed in the abovementioned "Switching Circuits Performing Thyristor and Triac Functions" U.S. Pat. No. 4,845,391 dated Jul. 04, 1989, by the same inventor, is recommended for a superior performance. In particular, the triac circuit has reduced forward voltage, increased switching speed and is triggered or fully controlled by an unipolar gate voltage.

Figure 2:
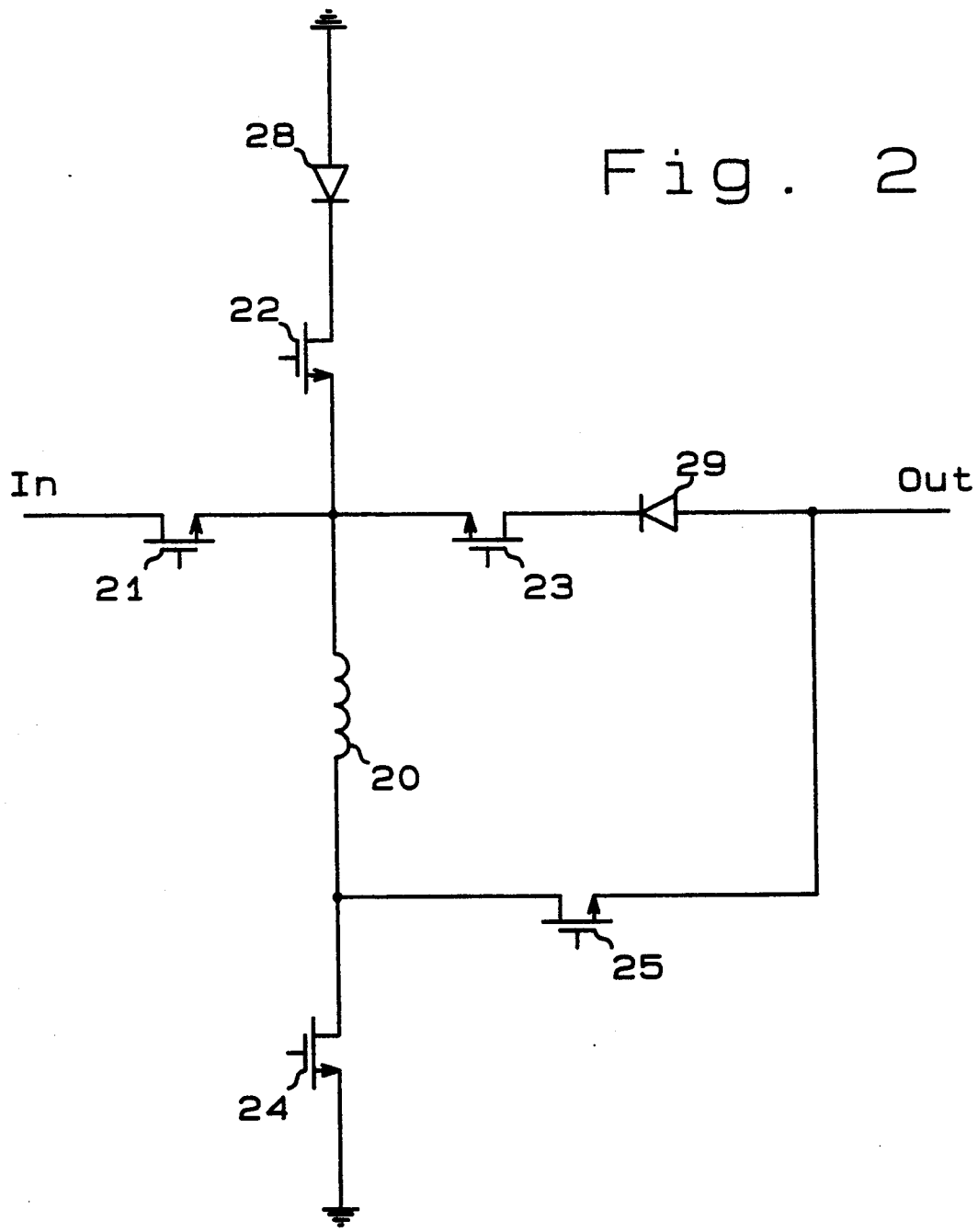
FIG. 2 is an embodiment of unidirectional SPS providing AC or DC output current. Boost function can be accomplished if a diode is coupled in series with the transistor 25.

FIG. 2 is an embodiment of unidirectional SPS providing AC or DC output current. The inductor 20 has a pair of terminals and attains a current. A first, second and third switches are each coupled to one terminal for selectively applying the inductor current to the input, ground and output respectively. A fourth and fifth switches are each coupled to the other terminal for selectively applying the inductor current to ground and output respectively. The first thru fifth switches comprise the n-channel MOSFETs 21 thru 25 respectively. The second and third switches each further include a series coupled diode.

Specifically, the transistors 21 thru 23 each have a source coupled to the one terminal of the inductor 20. The drain of the transistor 21 is coupled to the input. The cathodes of the diodes 28 and 29 are coupled to the drains of the transistor 22 and 23 respectively. The anodes of the diodes 28 and 29 are coupled to ground and output respectively. The diodes 28 and 29 are coupled to the drains rather than sources of the transistor 22 and 23 respectively as to simplify a switch driver circuit. The transistors 24 and 25 each have drain coupled to the other terminal of the inductor 20. The sources of the transistors 24 and 25 are coupled to ground and output respectively.

The operation of the SPS is illustrated in the following table. J is the current flowing thru the inductor 20, E is a positive voltage applied to the input and V is the voltage appearing at the output. The table shows which switches are closed to accomplish the desired changes of J and V in the directions indicated by up and down arrows. The minimum value of J is zero. The first thru fifth switches are marked as 1 thru 5 respectively. For instance, 3 indicates that the third switch is closed. Accordingly, the transistor 23 and diode 29 conduct J. E is always greater than V. The load is a resistor and capacitor coupled in parallel.

|  | J ↑ | J ↓ | Type |
|---|---|---|---|
| 0 < V ↑ | 15 | 25 | Buck |
| 0 > V ↓ | 14 | 34 | Flyback |

If V is positive, the SPS operates as the buck converter. High gate-source voltages are applied to the transistors 22 and 25, whereas the gate-source voltage of the transistor 21 is switched. The transistor 25 constantly conducts J. If V is too small, the transistor 21 is closed, whereas the transistor 22 is opened as the diode 28 is reverse biased. E-V is applied across the inductor 20, whereby J goes up. If J or V reaches the desired value, the transistor 21 is opened, whereby the transistor 22 and diode 28 take over J. J flows now to ground, whereby the inductor 20 is discharged.

If V is negative, the SPS operates as the flyback converter. High gate-source voltages are applied to the transistors 23 and 24, whereas the gate-source voltage of the transistor 21 is switched. The transistor 24 constantly conducts J. If V is too small, the transistor 21 is closed, whereas the transistor 23 is opened as the diode 29 is reverse biased. E is applied across the inductor 20, whereby J goes up. If J reaches the desired value, the transistor 21 is opened, whereby the transistor 23 and diode 29 take over J. J flows now to the load, whereby the inductor 20 is discharged.

The diodes 28 and 29 are coupled in series with the transistors 22 and 23 respectively for preventing reverse currents therein. Specifically, the diodes 28 and 29 are reverse biased when the transistor 21 is closed. When the SPS operates as the buck converter, the high gate-source voltages are applied to the transistors 22 and 25, whereby the second and fifth switches act as the diode 28 and short circuit respectively. Similarly, when the SPS operates as the flyback converter, the high gate-source voltages are applied to the transistors 23 and 24, whereby the third and fourth switches act as the diode 29 and short circuit respectively. The boost function can be accomplished if a diode is coupled in series with the transistor 25, as shown hereinbelow.

Figure 3:
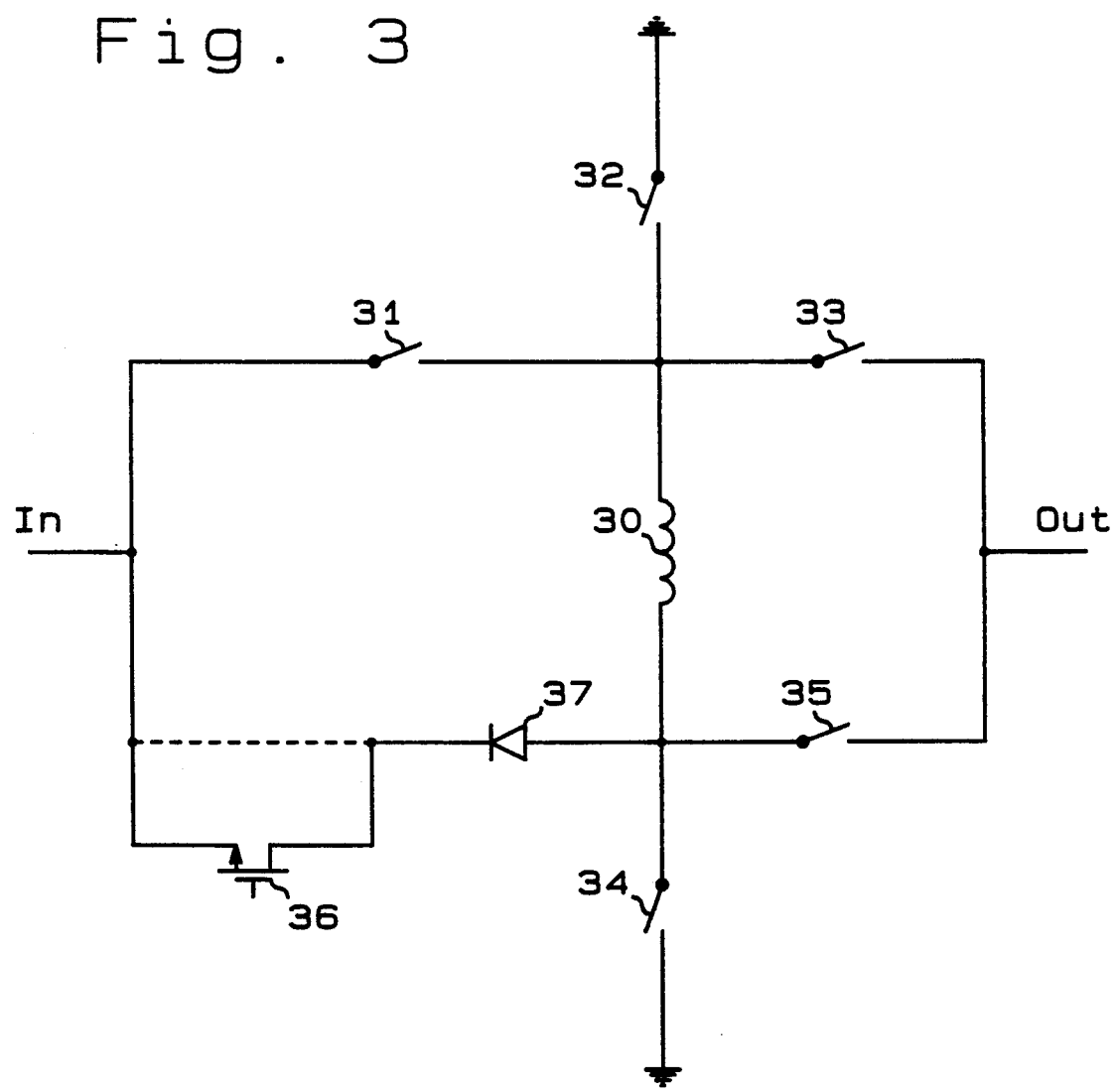
FIG. 3 is the preferred embodiment of the SPS whose additional components with respect to FIG. 2 embodiment are one, two, three or four diodes and possibly a transistor. The SPS is capable of transferring power from input to output and vice versa regardless of input and output voltage polarities.

FIG. 3 is the preferred embodiment of the SPS whose additional components with respect to FIG. 2 embodiment are one, two, three or four diodes and possibly a transistor. The first thru fifth switches are labeled as 31 thru 35 and correspond to the switches comprising the transistors 21 thru 25 of FIG. 2 respectively. However, each of the switches 31 thru 35 may comprise a transistor and diode coupled in series therewith.

This can be carried forward from FIG. 2 which shows the second and third switches having such a structure. Furthermore, a sixth switch comprising the n-channel MOSFET 36 and series coupled diode 37 can be employed.

The operation of the SPS is illustrated in the following table. The symbols are used as for the FIG. 2 embodiment. In particular, J is the current flowing thru the inductor 30, E is the input voltage and V is the output voltage. E is positive unless otherwise stated. The table shows which switches are closed to accomplish the desired changes of J and V as indicated by arrows. The first thru fifth switches are marked as 1 thru 5 and represent the switches 31 thru 35 respectively. The sixth switch is marked as 6 and acts as the diode 37. If the sixth switch further includes the transistor 36, a high gate-source voltage is constantly applied thereto. A type of allowable load depends on structure of the switches.

|  | J ↑ | J ↓ | Type |
|---|---|---|---|
| E < V ↑ | 14 | 15 | Boost |
| E < V ↓ | 36 | 26 | Buck |
| E > V ↑ | 15 | 25 | Buck |
| E > V ↓ | 34 | 36 | Boost |
| 0 > V ↑ | 25 | 26 | Flyback |
| 0 > V ↓ | 14 | 34 | Flyback |

In a first embodiment, the switches 31 thru 35 each comprise a transistor, whereas the switches 31 thru 33 each further include the series coupled diode. The components 36 and 37 are not used. The SPS is operative when E is greater than V but sustains E being smaller than V or negative since the switch 31 comprises the series coupled diode. When E is greater than V, the SPS operates as the FIG. 2 embodiment. Specifically, when V is positive and too small (E > V ↑), the SPS operates as the buck converter. The switches 31 and 32 are switched, whereas the switch 35 constantly conducts J. When V is negative and too small (0 > V ↓), the SPS operates as the flyback converter. The switches 31 and 33 are switched, whereas the switch 34 constantly conducts J.

In a second embodiment, the switches 31 thru 35 each comprise a transistor, whereas the switches 32, 33 and 35 each further include the series coupled diode. The components 36 and 37 are not used. When E is greater than V, the SPS operates as the buck and flyback converters, as the FIG. 2 embodiment. Moreover, the SPS operates as the boost converter, wherein the switches 31 and 35 act as short circuit and diode respectively. Specifically, when V is greater than E and too small (E < V ↑), the switches 34 and 35 are switched, whereas the switch 31 constantly conducts J. When the switch 34 is closed, E is applied across the inductor 30 and J goes up. If J reaches the desired value, the switch 34 is opened. The switch 35 applies J to the load, whereby the inductor 30 is discharged.

In a third embodiment, the SPS operates as unidirectional buck and boost converters, and bidirectional flyback converter. The switches 31 thru 35 each comprise a transistor, whereas the switches 32 thru 35 each further include the series coupled diode. The diode 37 is coupled to the other terminal of the inductor 30 for applying J to the input. The transistor 36 is not used. The SPS is operative when E is greater than V. The SPS operates as the buck and flyback converters to transfer power from the input to output, as the FIG. 2 embodiment.

The SPS also operates as the boost and flyback converters to transfer power from the output to input. Specifically, when V is positive and too large (E>V↓), the SPS operates as the boost converter. The switch 34 is switched, whereas the switch 33 constantly conducts J. When the switch 34 is closed, V is applied across the inductor 30 and J goes up. If J or V reaches the desired value, the switch 34 is opened. The diode 37 applies J to the input, whereby the inductor 30 is discharged. Similarly, when V is negative and too large (0>V↑), the SPS operates as the flyback converter. The switch 35 is switched, whereas the switch 32 constantly conducts J. When the switch 35 is closed, V is applied across the inductor 30 and J goes up.

If J or V reaches the desired value, the switch 35 is opened. The diode 37 applies J to the input, whereby the inductor 30 is discharged.

In a fourth embodiment, the SPS operates as bidirectional boost, buck and flyback converters. The switches 31 thru 35 each comprise a transistor and diode coupled in series therewith. The diode 37 is also used. The transistor 36 is not used. The SPS is operative when E is positive but sustains negative E since the switches 31 thru 35 comprise the series coupled diodes. The operation of the SPS as the boost, buck and flyback converters to transfer power from the input to output is the same as of the second embodiment of FIG. 3. The operation of the SPS as the boost and flyback converters to transfer power from the output to input is the same as of the third embodiment of FIG. 3.

The SPS also operates as the buck converter to transfer power from the output to input. Specifically, when V is greater than E and too large (E<V↓), the switches 32 and 33 are switched and diode 37 constantly conducts J. When the switch 33 is closed, V-E is applied across the inductor 30 and J goes up. If J or V reaches the desired value, the switch 33 is opened. The switch 32 applies J to ground, whereby the inductor 30 is discharged.

In a fifth embodiment, the SPS transfers power from the input to output or vice versa regardless of polarities of E and V. The SPS operates as bidirectional boost, buck and flyback converters. The transistor 36 and diode 37 are coupled in series between the other terminal of the inductor 30 and input, and constitute the sixth switch for selectively applying J to the input. The switches 31 thru 35 each comprise a transistor and series coupled diode, whereby all six switches have the same structure.

When E is positive, the SPS operates as the fourth embodiment of FIG. 3. The operation of the SPS is analogous when E is negative, whereas the functions of correlative switches are exchanged. The correlative switches are coupled to the same terminal of the SPS and opposite terminals of the inductor 30. Specifically, the switch 31 operates as sixth switch and the sixth switch operates as switch 31. Similarly, the functions of the switches 32 and 34 are exchanged. Finally, the functions of the switches 33 and 35 are exchanged. When E is positive, a high gate-source voltage is constantly applied to the transistor 36 so that the sixth switch acts as the diode 37. Consistently, when E is negative, a high gate-source voltage is constantly applied to the transistor of the switch 31 which thus acts as the series coupled diode. The first table relating to FIG. 3 is rewritten to illustrate the operation of the SPS when E is negative.

|  | J↑ | J↓ | Type |
|---|---|---|---|
| E > V↓ | 26 | 36 | Boost |
| E > V↑ | 15 | 14 | Buck |
| E < V↓ | 36 | 34 | Buck |
| E < V↑ | 25 | 15 | Boost |
| 0 < V↓ | 34 | 14 | Flyback |
| 0 < V↑ | 26 | 25 | Flyback |

Figure 4:
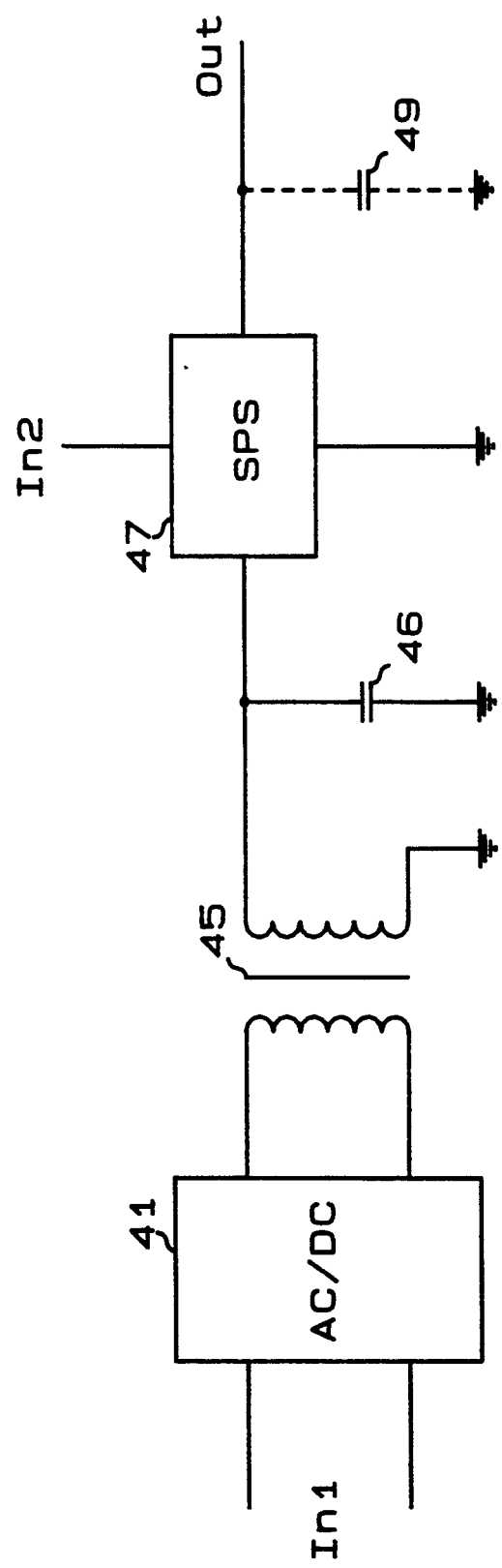
FIG. 4 is an embodiment of a switching power amplifier using the SPS, e.g. for high power audio amplification.

The SPS can be switched from one type to another while J is greater than zero. Moreover, only half of a function can be performed as to retain continuous input or output current. On top of that, the switching can be performed at zero voltage, zero current and completely automatically, i.e. without altering signals driving the respective switches. A practical example may be the operation of the SPS utilized in the switching power amplifier as shown in FIG. 4. The load is a resistor and capacitor coupled in parallel. E is a high frequency square wave voltage applied to the SPS and V is a low frequency voltage deriving from the SPS. For instance, V is positive and too small.

When E is greater than V, the switches 31 and 35 are closed. J is applied to the load and goes up. When E changes the polarity, J continues to flow in the same path but falls. In order to increase J regardless of the polarity of E, the switch driver provides signals as to close the switch 32 and sixth switch. When E is positive, the switches 31 and 35 conduct J, whereas the switch 32 and sixth switch are reverse polarized. When E changes polarity to negative, the switch 32 and sixth switch take over J automatically, whereas the switches 31 and 35 are reverse polarized. When J reaches the desired value, the switch driver provides signals as to open the switch 32 and sixth switch. The switch driver performs the switching when E is positive so that the transistors 36 and of the switch 32 are switched at zero voltage and zero current.

The above example confirms that only two switches are closed at any time. All switches are unidirectional and only one of the three switches coupled to the same terminal of the inductor 30 may conduct J at one time. Accordingly, the problem of overlapping conduction phases of the switches does not exist. The reliability is very high. The current flowing thru any closed switch is equal J. Moreover, the switches interact dependent on polarities of E, V and E-V as illustrated in the following table.

|  | Interacting | |
|---|---|---|
| E-0 | 1-2 | 4-6 |
| V-0 | 2-3 | 4-5 |
| E-V | 1-3 | 5-6 |

For instance, the table shows that if the switch driver provides signals as to close the switches 31 and 33, marked as 1-3, they interact dependent on polarity of E-V. Specifically, whether E is greater or smaller than V determines which switch 31 or 33 actually conducts J. The table also indicates that the voltage at the respective terminal of the inductor 30 is either E or V. Moreover, the correlative switches appear in the same lines of the table. For instance, the last line specifies the first and sixth switches which are correlative, third and fifth switches which are also correlative. Closing correlative switches at the same time should be avoided.

Other switching devices, e.g. thyristors, can operate as one or more switches of the SPS. A thyristor is automatically turned off by reducing its principal current below a hold current, wherein the principal current is equal J. The thyristor can be also turned off by reducing its anode voltage. This can be accomplished by applying adequate E so that another switch, possibly thyristor as well, takes over J automatically. A thyristor circuit disclosed in the abovementioned "Switching Circuits Performing Thyristor and Triac Functions" U.S. Pat. No. 4,845,391 dated Jul. 04, 1989, by the same inventor, is recommended for a superior performance. In particular, the thyristor circuit has reduced forward voltage and increased switching speed.

It shall be explicitly pointed out that regardless of the configuration and polarities of E and V, J flows in one direction. The short circuit current can be determined by a comparator which monitors J. A pair of comparators can monitor E and V. The SPS can be carried out in integrated form as 3-terminal device if the waveform of V is predetermined or is a function of E.

FIG. 4 is an embodiment of a switching power amplifier using the SPS, e.g. for high power audio amplification. Power amplifiers are devices designed to amplify an input signal and provide an undistorted output signal which is independent of supply voltages, load fluctuations over frequency, operating temperature, etc. Switching power amplifiers have high efficiency and small size but also demonstrate many deficiencies. In particular, they are very complex and expensive. Integrated circuits comprising linear power amplifiers are readily available. In contrast, manufacturers attempt to implement special techniques in the absence of integrated circuits comprising switching power amplifiers.

The switching power amplifier shown in FIG. 4 comprises a generator means and SPS 47 which has the structure shown in FIG. 3. The efficiency is very high. The generator means consists of the AC/AC converter 41 and transformer 45 which are shown as separate blocks to point out that line isolation is accomplished and generator output voltage is AC. The secondary of the transformer 45 has a single winding coupled to ground and provides the generator output voltage having a high frequency. The capacitor 46 is coupled across the secondary to prevent any voltage spikes since the input current of the SPS 47 is interrupted. A transient voltage suppressor can be also employed. The capacitor 46 has a small value. The load is coupled directly to the output of the SPS 47, wherein short circuit protection is inherent.

The capacitor 49 is coupled between amplifier output and ground to store the amplifier output voltage, reduce voltage ripple and prevent voltage spikes at the amplifier output. The capacitor 49 may be also a portion of the load. The internal inductor of the SPS 47 and capacitor 49 operate as a time constant network rather than low-pass filter since the result is a corrective noise signal superimposed onto the amplifier output voltage.

Figure 6:
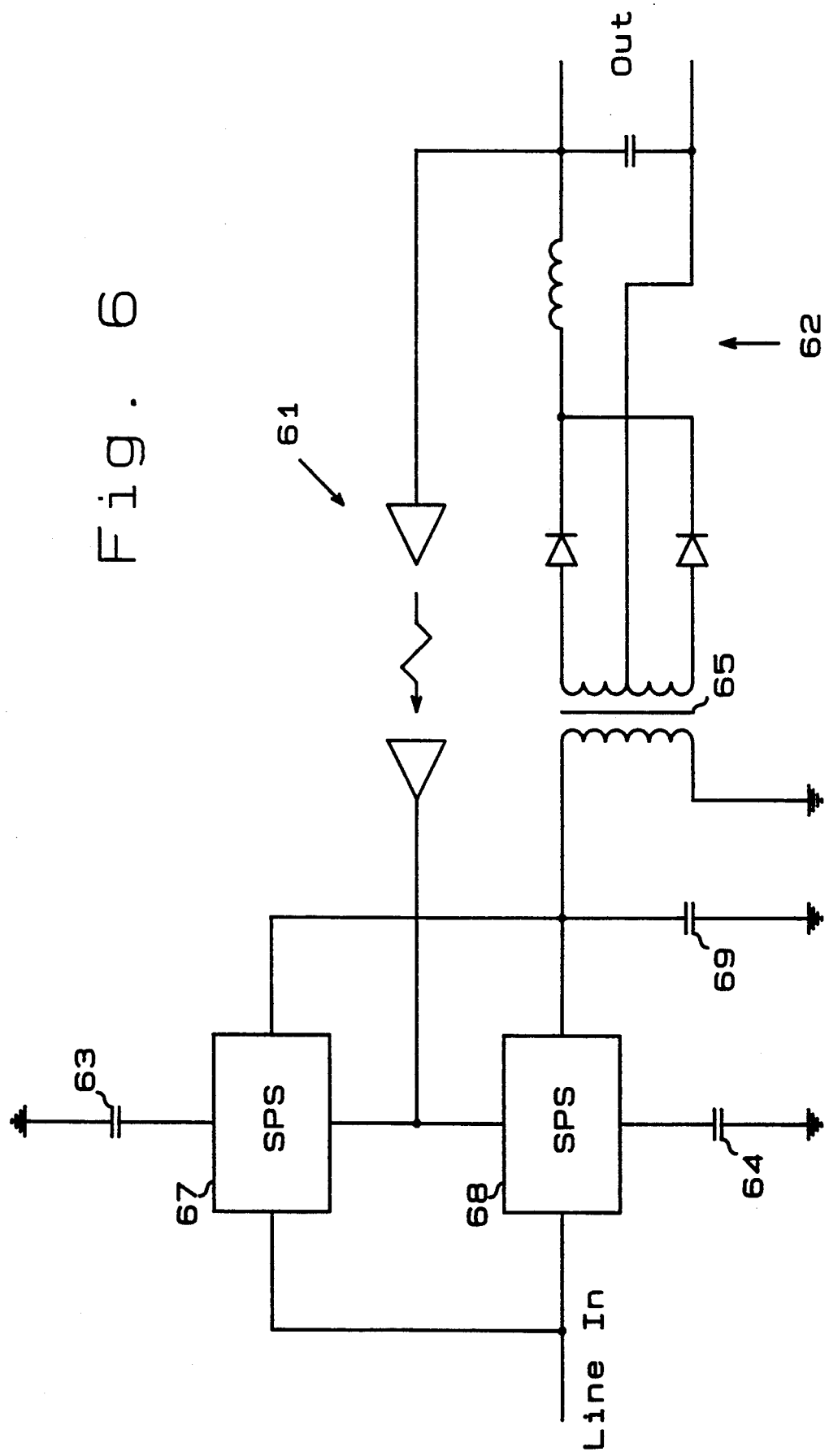
FIG. 6 is an embodiment of a simple AC/DC converter with two SPSs, isolation and inherent short circuit protection. Input current has a desired waveform, e.g. sinusoidal.

The generator means may be an ordinary SPS for converting the line voltage into unstabilized high frequency square wave which is the generator output voltage. The AC/AC converter 41 may be the circuit driving the transformer 65, as shown in FIG. 6. The amplitude of the generator output voltage may be smaller than amplitude of the amplifier output voltage due to the boost function of the SPS 47. The SPS 47 receives the generator output voltage, wherein regardless of its polarity a push-pull driving of the load is accomplished. The amplifier output voltage may be AC or DC. The SPS 47 is bidirectional, whereby power flow can be reversed. The SPS 47 can convert a voltage across the load, acting as the energy source, into high frequency signal. Power is further transferred via the transformer 45 back to the AC/AC converter 41.

The SPS 47 may also comprise a comparator circuit for monitoring the amplifier input voltage at In2, generator output voltage and amplifier output voltage. By these means, the SPS 47 provides the output current which has value and polarity as to allow the correction of the amplifier output voltage. The amplitude of the generator output voltage may depend on the amplifier input voltage as to increase the efficiency. An input comparator compares the amplifier input voltage against the amplifier output voltage. The input comparator may have a hysteresis which varies with level of the amplifier output voltage since the distortion level depends thereon. This technique has been disclosed in the abovementioned "Switching Power Supply" U.S. Pat. No. 4,803,610 dated Feb. 7, 1989 and is further considered in the abovementioned "Switching Power Amplifier" U.S. Pat. No. 4,763,080 dated Aug. 9, 1988 and "Ultra Efficient Switching Power Amplifier" U.S. Pat. No. 4,980,649 dated Dec. 25, 1990 by the same inventor.

Figure 5:
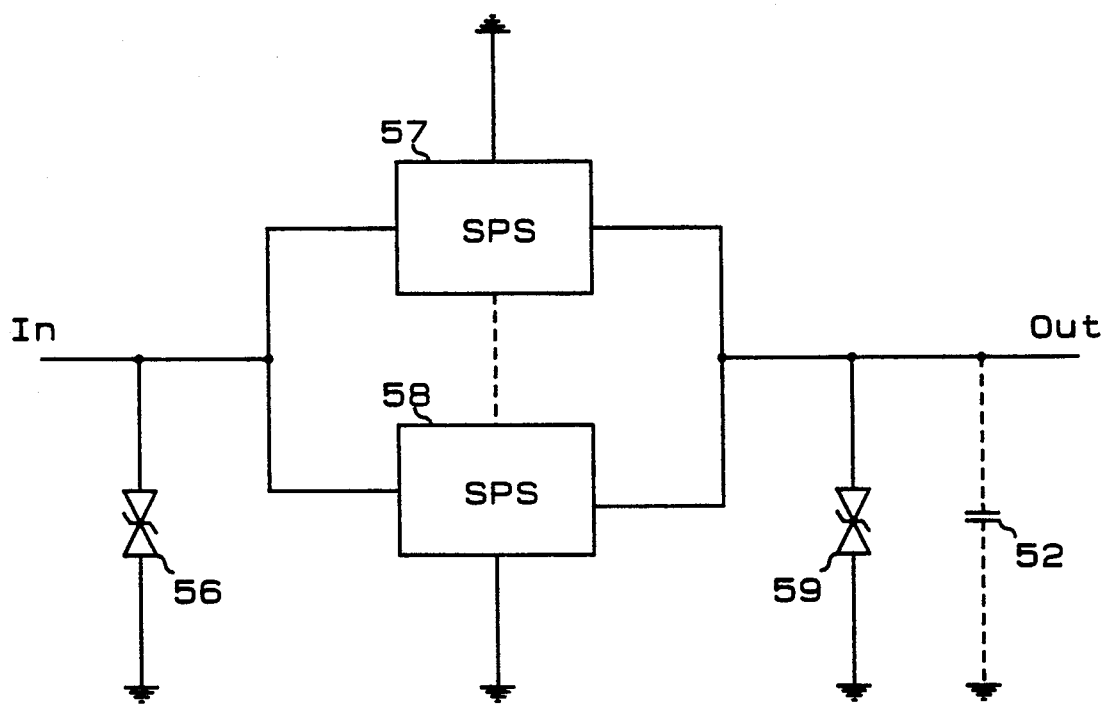
FIG. 5 is an embodiment of a power supply system with two SPSs coupled in parallel for increasing output power and decreasing input and output ripple currents. One or two SPSs and capacitor can be employed as power factor correction circuit with DC output.

FIG. 5 is an embodiment of a power supply system with two SPSs coupled in parallel for increasing output power and decreasing input and output ripple currents. The input voltage may be AC or DC. The SPSs 57 and 58 are referenced to ground. The system also comprises a means for reducing voltage spikes at the system input and output. Specifically, the transient suppressor 56 is coupled between the system input and ground to limit input voltage spikes. Similarly, the transient suppressor 59 is coupled between the system output and ground to limit output voltage spikes. A pair of capacitors can be coupled in parallel with or, as shown in FIG. 4, substituted for the suppressors 56 and 59 as to reduce the voltage spikes. An integrated circuit comprising the SPS 57 or SPSs 57 and 58 can also include the suppressors 56 and 59.

Preferably, the SPSs 57 and 58 have the same configuration and comprise the same type of components. The SPSs 57 and 58 may operate independently if they are unidirectional. However, if the SPSs 57 and 58 are bidirectional, an additional connection is provided therebetween to accomplish a synchronization. Specifically, it must be prevented that the output currents of the SPSs 57 and 58 are rising while flowing in opposite directions. The SPSs 57 and 58 can be also synchronized to decrease input and output ripple currents. For instance, the input current of the buck converter is interrupted whenever its input switch is opened. In contrast, the output current is uninterrupted. Therefore, if one SPS operates as buck converter and its input switch is opened, the input switch of the other SPS can be closed.

The power supply system can operate as AC/DC converter. In particular, power factor correction can be accomplished when the line voltage is applied to the system input. The SPS 58 and suppressors 56 and 59 are optional. The capacitor 52 is coupled to ground for providing a fixed DC output voltage in response to the output current of the SPS 57. The output voltage may be positive or negative, and higher or lower than peak of the line voltage. The capacitor 52 has a large value. The circuit comprising the SPS 57, SPSs 57 and 58 or components 56 thru 59 can be carried out in integrated form as 3-terminal device since the waveform of the input current is predetermined, i.e. sinusoidal. Inrush and surge currents are eliminated.

For instance, the AC/DC converter comprises the SPS 57 and capacitor 52 which stores a positive voltage. It is initially assumed that the SPS 57 has the structure shown in FIG. 3. The operation of the SPS 57 is illustrated in the following table which derives from the first and second tables relating to FIG. 3. The same symbols are used. The capacitor 52 is charged by the SPS 57 and discharged thru a load.

|  | J↑ | J↓ | Type |
|---|---|---|---|
| E > 0 and E < V↑ | 14 | 15 | Boost |
| E > V↑ | 15 | 25 | Buck |
| E < 0 and V↑ | 26 | 25 | Flyback |

The table reveals that the third switch is superfluous, whereby only one switch is coupled to the output of the SPS 57. This simplified structure is analogous to that shown in FIG. 2 when the input and output connections are exchanged. It is therefore considered that the SPS of the present invention has a first and second nodes separately coupled to the input and output in either order. The first and possibly sixth switches selectively apply the inductor current to the first node. The third and fifth switches selectively apply the inductor current to the second node. Moreover, the functions of the correlative switches may be exchanged as specified hereinabove in reference to FIG. 3. Specifically, the first, second, third, fourth, fifth and sixth switches are considered sixth, fourth, fifth, second, third and first switches respectively. In the present example, the first and second nodes are coupled to the output and input respectively, and the correlative switches are exchanged.

FIG. 6 is an embodiment of a simple AC/DC converter with two SPSs, isolation and inherent short circuit protection. The SPSs 67, 68 and capacitor 63 constitute an SPS which converts the AC input voltage applied to input into AC or DC output current appearing at a node. The capacitor 64 is optional. Specifically, the capacitor 63 has a terminal and is coupled to ground for storing a positive voltage. The SPS 67 operates as a first converter for converting a voltage appearing between the input and terminal into a first current. The SPS 68 is referenced to ground and operates as a second converter for converting the AC input voltage into a second current. The first and second currents are applied to the node. The capacitor 64 is employed to increase performance of the AC/DC converter. The capacitor 64 has a second terminal and is coupled to ground for storing a negative voltage. The SPS 68 is coupled to the capacitor 64 rather than ground and therefore converts a voltage appearing between the input and second terminal into the second current.

The SPSs 67 and 68 have the structure shown in FIG. 3. Accordingly, the second and fourth switches of the SPS 67 selectively apply the inductor current to the capacitor 63 rather than ground. Similarly, the second and fourth switches of the SPS 68 apply the inductor current to the capacitor 64 rather than ground. Currents flowing thru the second and fourth switches have opposite polarities, whereby the capacitors 63 and 64 are charged and discharged. The capacitor 69 is coupled to ground for reducing voltage spikes at the node.

The transformer 65 can be employed if the output current is AC, preferably having high frequency. The conventional circuit 62 rectifies and filters an induced current established in the secondary. Specifically, the transformer 65 has primary coupled between the node and ground, and secondary which provides a second AC output current. A pair of diodes is coupled across the secondary for rectifying the second AC output current. A capacitor is coupled to the diodes and further to center-tap of the secondary for storing the DC output voltage of the AC/DC converter. An optional inductor is coupled between the diodes and capacitor for reducing an output ripple current.

The transformer 65 is current rather than voltage driven, whereby the short circuit protection of the AC/DC converter is inherent. Generally, the voltage appearing at the node has fixed or variable amplitude which is higher or lower than amplitude of the AC input voltage. The optocoupler circuit 61 monitors the DC output voltage. Specifically, this voltage is compared against a fixed reference voltage by a comparator. A buffer is optically coupled thereto and provides a signal to the SPSs 67 and 68 in response to the comparison. The buffer acts as an output stage of the comparator.

For instance, the AC/DC converter is coupled to line. Obviously, an input line filter is also employed but not shown for simplicity. The SPS 67 operates when the line voltage is above a positive threshold voltage or is negative and above a negative threshold voltage. Similarly, the SPS 68 operates when the line voltage is below the negative threshold voltage or is positive and below the positive threshold voltage. The positive and negative threshold voltages are greater and smaller than the voltages stored in the capacitors 63 and 64 respectively. By these means, average currents flowing therethrough during a full wave of the line voltage are zero.

The SPSs 67 and 68 can also operate simultaneously as to obtain a specific waveform of the line current, e.g. sine wave. Specifically, the SPSs 67 and 68 each comprise an inductor whose current flows in one direction. However, the input and output currents of the SPSs 67 and 68 can have any polarity. The input current of the AC/DC converter is equal to a sum of the input currents of the SPSs 67 and 68 so that the desired waveform of the line current can be simulated. The capacitor 69 has a small value. In contrast, the capacitors 63 and 64 have large values as to deliver energy during power failure. Inrush and surge currents are eliminated.

The present invention represents a significant advance in the field of SPSs. The SPS can be carried out as 3-terminal hybrid integrated circuit. Additional terminals can be established for reference and control signals. Numerous standard devices can be built by adding just a few components, possibly no power semiconductors.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting AC or DC input voltage applied to an input into AC or DC output current appearing at an output, comprising:

a first and second nodes separately coupled to the input and output in either order;

an inductive means having a pair of terminals, for attaining a current;

a first, second and third switching means each coupled to one terminal for selectively applying the inductive means current to the first node, ground and second node respectively; and a fourth and fifth switching means each coupled to the other terminal for selectively applying the inductive means current to ground and second node respectively.

2. Switching power supply of claim 1 wherein at least one switching means includes an unidirectional switch.

3. Switching power supply of claim 2 wherein the unidirectional switch includes a transistor and diode coupled in series therewith.

4. Switching power supply of claim 1 further including a diode means coupled to the other terminal for applying the inductive means current to the first node.

5. Switching power supply of claim 1 further including a sixth switching means coupled to the other terminal for selectively applying the inductive means current to the first node.

6. Switching power supply of claim 5 wherein the sixth switching means includes an unidirectional switch.

7. Switching power supply of claim 6 wherein the unidirectional switch includes a transistor and diode coupled in series therewith.

8. Switching power supply of claim 1 further including a capacitive means coupled to ground for storing a DC voltage, wherein the second and fourth switching means selectively apply the inductive means current to the capacitive means.

9. Switching power supply of claim 1 further including a capacitive means for providing a DC output voltage in response to the output current.

10. Switching power supply of claim 1 further including a means for reducing voltage spikes at the input and/or output.

11. Switching power supply of claim 10 wherein the means for reducing includes at least one capacitor.

12. Switching power supply of claim 10 wherein the means for reducing includes at least one transient suppressor.

13. Switching power supply of claim 1 further including a generator means for providing the input voltage, wherein the input voltage is AC.

14. Switching power supply of claim 13 wherein the generator means includes a transformer coupled to the input.

15. Switching power supply converting AC input voltage applied to an input into AC or DC output current appearing at an output, comprising:

a capacitive means having a terminal and coupled to ground for storing a voltage;

a first converter means for converting a voltage appearing between the input and the terminal into a first current; and a second converter means for converting the AC input voltage into a second current, wherein the first and second currents are applied to the output.

16. Switching power supply of claim 15 further including a second capacitive means having a second terminal and coupled to ground for storing a second voltage, wherein the second converter means converts a voltage appearing between the input and second terminal into the second current.

17. Switching power supply of claim 15 further including a second capacitive means for reducing voltage spikes at the output.

18. Switching power supply of claim 15 wherein said first output current is AC, and further including a transformer means coupled to the output for providing a second AC output current.

19. Switching power supply of claim 18 further including:

a rectifying means for rectifying the second AC output current; and a second capacitive means coupled to the rectifying means for storing a DC output voltage.

20. Switching power supply of claim 19 further including a comparator means for sensing the DC output voltage and providing a signal to the first and second converter means.

* * * * *